March 16, 1926.
E. N. AUSTIN
1,576,497
MILK DISPENSING AND MEASURING DEVICE
Filed June 12, 1925      2 Sheets-Sheet 2
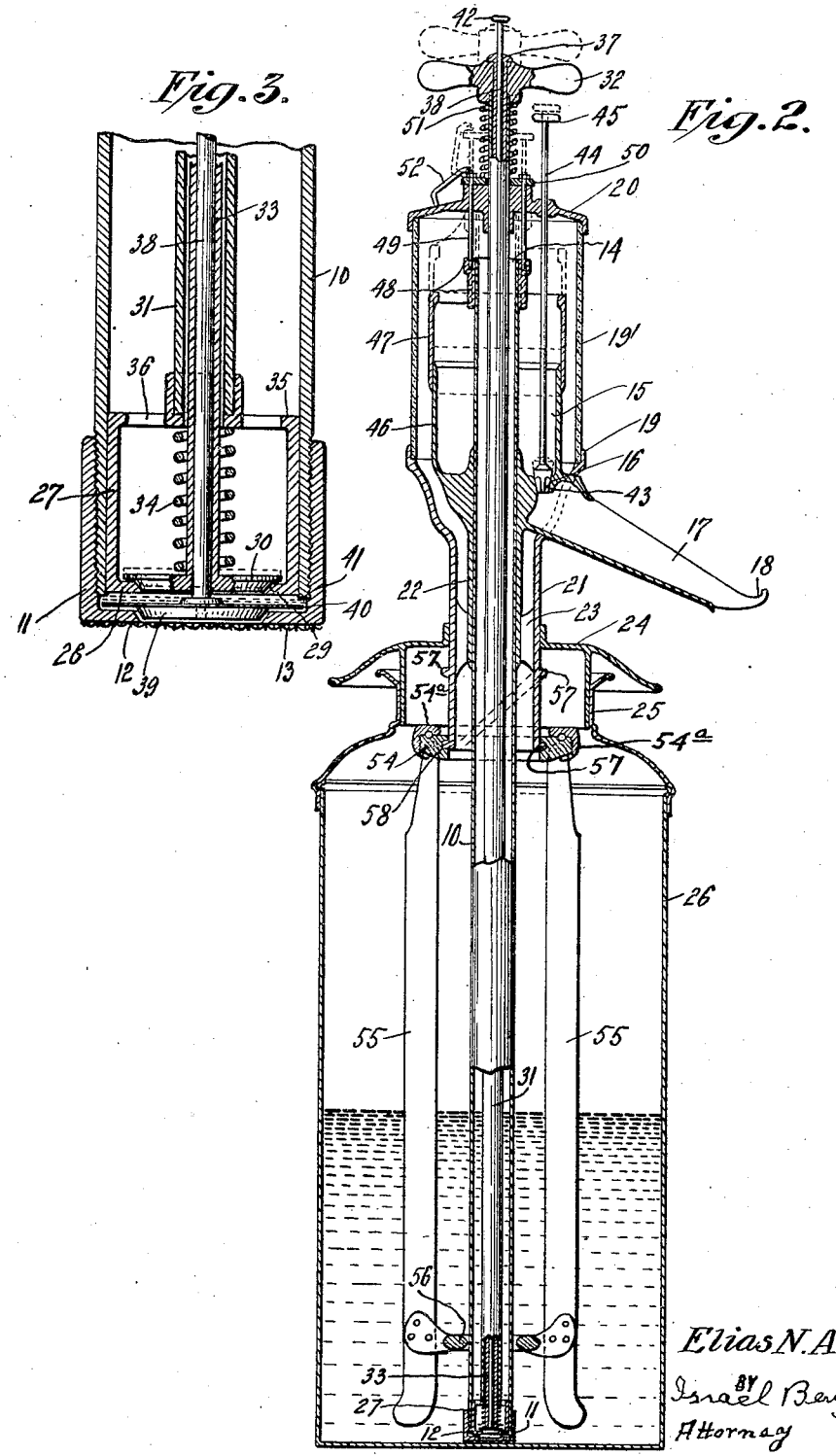
INVENTOR
Elias N. Austin
BY Israel Benjamin
Attorney Patented Mar. 16, 1926.

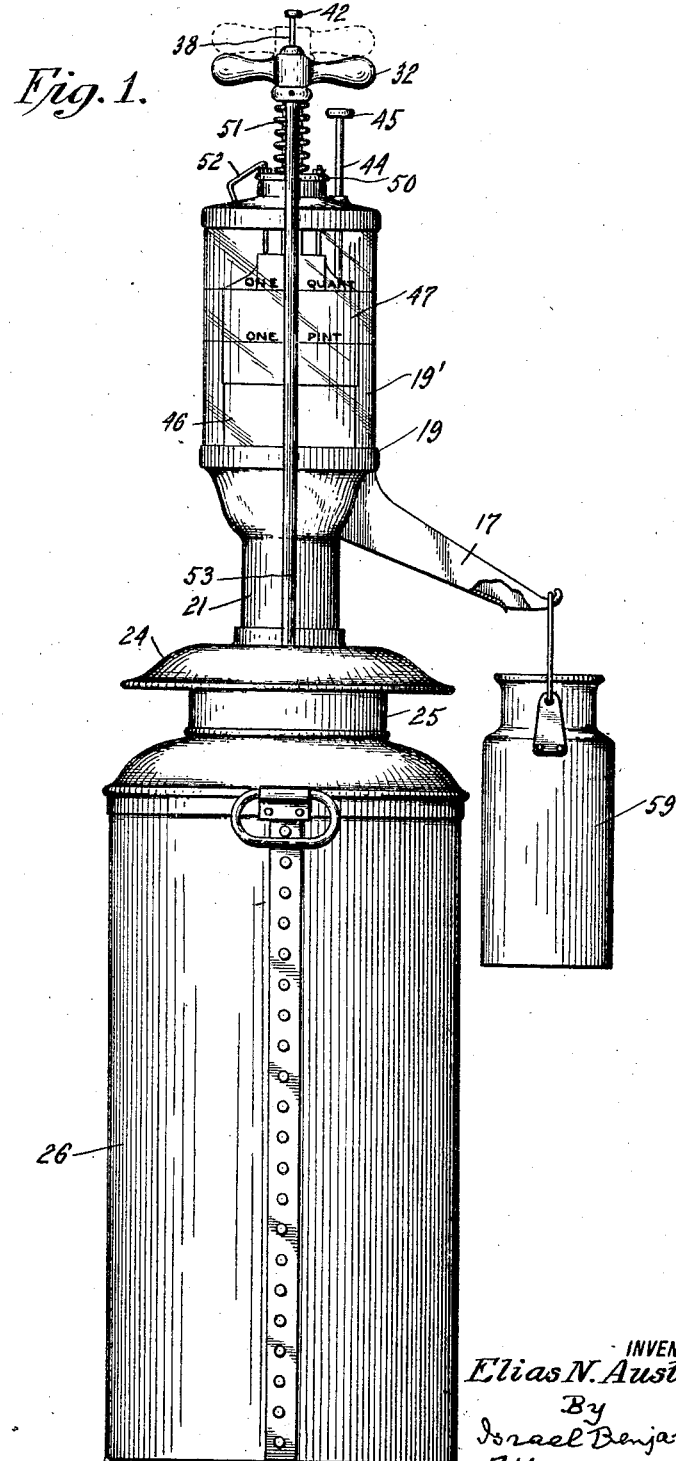

1,576,497

UNITED STATES PATENT OFFICE.

ELIAS N. AUSTIN, OF NEW YORK, N. Y.

MILK DISPENSING AND MEASURING DEVICE.

Application filed June 12, 1925. Serial No. 36,645.

*To all whom it may concern:*

Be it known that I, ELIAS N. AUSTIN, a citizen of the United States (whose residence and post-office address are at 1135 Intervale Avenue, New York, in the county of Bronx and State of New York), have invented a new and useful Milk Dispensing and Measuring Device, of which the following is a specification.

My invention relates to improvements in milk dispensing devices, and it consists in the novel features hereinafter more fully described.

One of the objects of my invention is to produce a milk dispensing and measuring device, which may conveniently be mounted upon the milk container and may serve also for mixing the contents thereof.

Another object of my invention is to produce a milk dispensing and measuring device, wherein the capacity of the measuring vessel may be varied.

A further object of my invention is to have my milk dispensing and measuring device simple, durable and comparatively inexpensive.

Other objects and advantages will hereinafter appear.

I attain these objects by the milk dispensing and measuring device, one form of which is illustrated in the accompanying drawings or by any mechanical equivalent or obvious modification of the same.

In the drawings Fig. 1 is an elevation of my milk dispensing and measuring device, shown as mounted upon a milk container; Fig. 2 is a central vertical section through the said device and container; and Fig. 3 is a similar section, on a large scale, through the pump of said device.

In Figs. 2 and 3 of the drawings 10 designates a pump cylinder, the lower end of which has thereon a cap 11, which has therein an inlet 12.

A coarse-meshed wire screen 13 extends over said inlet 12 to prevent impurities from entering the pump cylinder 10 and to space the latter from the bottom of the milk container, on which it may rest.

The cylinder 10 extends through a measuring vessel 15, and the upper end of the cylinder is open to discharge milk into said vessel, which has at its bottom a discharge opening 16 communicating with a spout 17, which terminates in a hook-shaped outer end 18.

Said vessel 15 is enclosed by a housing 19—19', which has a transparent cylindrical wall 19', through which said vessel 15 may be observed. Said housing 19—19' has thereon a cover 20, and its lower end terminates in a cylindrical extension 21, which passes through a cover 24 of a milk can 26, having a neck 25, and is coaxial with a similar extension 22 at the lower end of said vessel 15.

The extensions 21 and 22 are spaced apart by webs 23 on the inside of said extension 21, which permit the passage of milk therebetween.

The lower end of the cylinder 10 has slidably disposed therein a hollow piston 27, the lower head 28 of which has therein an opening 29, the rim of which forms a seat for a conical piston valve 30.

The piston 27 has secured thereto a tubular piston rod 31, which extends through said cover 20, and has connected thereto at its upper end an operating handle 32.

The said piston valve 30 has secured thereto a tube 33, which slidably extends through said rod 31 and terminates above said handle 32 in a flange 37.

The valve 30 is held on its seat by the lower end of a spring 34, which is coiled around said tube 33 and has its upper end abutting against the underside of the upper head 35 of said piston 27, which head 35 has therein openings 36.

The inlet 12 of the cap 11 is controlled by a foot valve 39, which has secured thereto a rod 38, which extends through said tube 33 and terminates above said flange 37 in a knob 42.

The foot-valve 39 has thereon also extensions 40, which are intercepted by the lower edge 41 of said cylinder 10, to limit the upward movement of said valve 39.

The discharge opening 16 is controlled by a valve 43, secured to the lower end of a rod 44, which extends through said cover 20, and terminates at its upper end in a plate 45.

The measuring vessel 15 consists of two sections 46 and 47, the former of which is stationary and is preferably of one pint capacity; the section 47 is a sleeve secured to a collar 48, which is slidable on the upper end of said cylinder 10, and is connected to a disc 50 on said cover 20 by means of bolts 49, which slidably extend through said cover 20.

A compression spring 51 is interposed between the disc 50 and said handle 32, to normally keep said section 47 on said section 46 of said vessel 15, and also to keep the operating handles 32 of the pump 27 at the highest position.

To the operating handle 32 are connected a pair of rods 53, one of which is shown in Fig. 1, which rods extend through the container cover 24 and are connected to a ring 54$^a$, which overlaps another ring 54, which is adapted to rotate with relation to said ring 54$^a$, and to be raised and lowered thereby.

A roller bearing may be interposed between said rings 54 and 54$^a$, as shown.

The rings 54 and 54$^a$ encircle the lower end of the extension 21 of the housing 19.

The ring 54 has secured thereto two vertically extending stirring blades 55, which are connected near their lower ends by a ring 56, which fits loosely on the pump cylinder 10. The lower end of the extension 21 has on its periphery two helical or cam shaped ridges 57, fitting each into a groove 58 in the lower ring 54, whereby by raising on lowering the rods 53 with the rings 54 and 54$^a$ the ring 54 is made to rotate alternately in opposite directions, thereby turning said blades 55 therewith and thereby stirring up the milk in the can 26.

The operation of my milk dispensing and measuring device is as follows:

The can cover 24 with the parts carried thereby are placed in position on the milk can 26; the wire screen on the underside of the cap 11 may be brought to bear against the bottom of the can, or it may be spaced therefrom in any suitable manner. If a quart of milk is to be dispensed, the sleeve 47 of the measuring vessel 15 is brought into the position shown in full lines in Fig. 2; the valve 43 is set into closing position, and the receptacle 59, shown in Fig. 1, into which the milk is to be dispensed, is suspended from the hook shaped end 18 of the spout 17.

Normally the piston 27 is held in its upper position by the spring 51, and the foot-valve 39 is kept on its seat by gravity.

The piston valve 30 is normally held in position by the spring 34. When the piston is depressed by means of the operating handle 32, the milk enclosed between said two valves unseats the piston valve 30, and milk flows into the hollow piston 27 during the downstroke of the latter.

During the upward stroke of the piston, which is effected or aided by the spring 51, a suction is produced in the space between the piston valve 30 and the foot valve 39, whereby the foot-valve 39 is unseated, and milk flows into said space. By repeating the pumping strokes, milk rises in the pump cylinder 10, until it overflows into the measuring vessel 15.

When said vessel 15 is filled, it may be observed through the transparent wall 19' of said housing 19—19', whereupon the pumping operation is discontinued.

The valve 43 is then unseated by means of the rod 44 and plate 45, and the milk discharged through the spout 17 into the receptacle 59. As the piston is being reciprocated the stirring blades 55 are rotated by the ring 54, thereby mixing the milk while it is being dispensed. To set the device for dispensing one pint of milk the sleeve 47 is lifted from the section 46 of the vessel 15 by means of the disc 50, and is retained in its upper position by engaging the free end of the latch 52 with the cover 20, as shown in dotted lines in Fig. 2; milk, when pumped, will then overflow the rim of said section 46 and return to the container 26.

After each dispensing operation the operator may lift the knob 42 and the flange 37 and unseat the valves 39 and 30, whereby the milk remaining in the cylinder 10 is returned to the can 26.

Many changes may be made in the details of my milk dispensing and measuring device without departing from the main scope of my invention, and parts of my invention may be used without other parts.

I do not, therefore, restrict myself to the details as shown; but I intend to include also all mechanical equivalents and obvious modifications of the same within the scope of my invention.

I claim as my invention, and desire to secure by Letters Patent:

1. The combination with a milk container of a milk dispensing device comprising a measuring vessel, a pump for supplying milk from said container to said vessel, stirring blades within said container, and means for actuating said stirring blades by the operation of said pump.

2. In a milk dispensing and measuring device a measuring vessel comprising a lower stationary section, to serve as a measure of lesser capacity, and an upper section removably mounted on said lower section, to form therewith a measure of larger capacity.

3. The combination with a milk container, having thereon a cover, of a pump cylinder extending through said cover, a measuring vessel disposed around the upper open end of said cylinder, a cap at the lower end of said cylinder, an inlet opening in said cap, a foot valve controlling said opening, a piston slidably disposed within said cylinder, a hollow piston rod extending above said cylinder, a handle at the upper end of said rod, a piston valve at the lower end of said piston, a tube secured to said piston valve and extending through said piston rod above said handle, and a rod extending through said tube above the upper end thereof, secured to said foot valve, whereby both valves may be manually unseated.

4. In a milk dispensing and measuring device a milk container, a cover thereon, a housing on said cover communicating with the interior of said container, a measuring vessel placed inside of said housing concentrically therewith, a pump cylinder passing through said vessel and overflowing into the latter, a discharge valve at the lower end of said vessel and a discharge spout leading from said vessel and passing through the side of said housing.

5. In a milk dispensing and measuring device a pump, for raising milk from a container, a measuring vessel for said milk, conduits, for the milk to pass therethrough while being raised, valves in said pump and a means for manually unseating said valves from the outside of said vessel, thereby releasing the milk contained in said conduits after each dispensing operation.

6. In a milk dispensing device a pump for raising milk from a container, a piston in said pump, a means for imparting a reciprocating motion to said piston, a rotary milk-stirring mechanism, a vertically disposed helically threaded member, a corresponding member in engagement with said threaded member and connected to said mechanism, said corresponding member being connected to said imparting means, whereby a reciprocating motion is imparted thereto with relation to said threaded member and a rotary motion is imparted to said mechanism.

ELIAS N. AUSTIN.